United States Patent
Kunieda

(10) Patent No.: US 12,231,730 B2
(45) Date of Patent: *Feb. 18, 2025

(54) PROVIDING ACTIVITY NOTIFICATIONS REGARDING DIGITAL CONTENT

(71) Applicant: SONY INTERACTIVE ENTERTAINMENT LLC, San Mateo, CA (US)

(72) Inventor: Shunsuke Kunieda, San Francisco, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/959,609

(22) Filed: Oct. 4, 2022

(65) Prior Publication Data

US 2023/0101328 A1 Mar. 30, 2023

Related U.S. Application Data

(63) Continuation of application No. 15/904,163, filed on Feb. 23, 2018, now Pat. No. 11,463,773.

(51) Int. Cl.
*H04N 21/466* (2011.01)
*H04N 21/442* (2011.01)
(Continued)

(52) U.S. Cl.
CPC ... *H04N 21/4667* (2013.01); *H04N 21/44204* (2013.01); *H04N 21/44224* (2020.08); *H04N 21/4788* (2013.01); *H04W 4/12* (2013.01)

(58) Field of Classification Search
CPC ......... H04N 21/4667; H04N 21/44204; H04N 21/44222; H04N 21/4788
See application file for complete search history.

(56) References Cited

U.S. PATENT DOCUMENTS 9,449,002 B2  9/2016 Andavarapu
9,510,051 B1  11/2016 Bostick et al.
(Continued)

FOREIGN PATENT DOCUMENTS

CN          112585985 A      3/2021
CN    ZL201980021098.X      1/2023
(Continued)

OTHER PUBLICATIONS

European Application No. 19756885.0 Extended European Search Report dated Aug. 2, 2021.
(Continued)

*Primary Examiner* — Pinkal R Chokshi
(74) *Attorney, Agent, or Firm* — Kilpatrick Townsend & Stockton LLP

(57) ABSTRACT

This disclosure describes techniques for providing notifications regarding relevant and trending digital content. For example, these techniques include identifying an instance of content accessible over a network as relevant content, monitoring a volume of activity associated with the relevant content over a period of time, comparing the volume of activity over the time period to a threshold level, and sending a notification to a client device when the volume of activity exceeds the threshold level.

17 Claims, 6 Drawing Sheets

(51) Int. Cl.
*H04N 21/4788* (2011.01)
*H04W 4/12* (2009.01)

(56) References Cited

U.S. PATENT DOCUMENTS

| | | | |
|---|---|---|---|
| 9,635,638 B1* | 4/2017 | Burlingham | H04W 4/18 |
| 9,959,551 B1* | 5/2018 | Schermerhorn | H04L 67/63 |
| 11,463,773 B2 | 10/2022 | Kunieda | |
| 2011/0247037 A1 | 10/2011 | Pandey et al. | |
| 2011/0288912 A1 | 11/2011 | McCrea et al. | |
| 2012/0166530 A1 | 6/2012 | Tseng | |
| 2014/0164404 A1 | 6/2014 | Hunt et al. | |
| 2014/0359647 A1* | 12/2014 | Shoemake | H04N 21/6582 725/10 |
| 2015/0113547 A1* | 4/2015 | Wolf | H04N 21/84 725/9 |
| 2015/0142899 A1 | 5/2015 | Birney et al. | |
| 2015/0215816 A1 | 7/2015 | Abou-Elkheir et al. | |
| 2016/0249115 A1* | 8/2016 | Lincke | H04N 21/233 |
| 2016/0330526 A1* | 11/2016 | Marchetti | H04N 21/458 |
| 2017/0142462 A1* | 5/2017 | Uhrich | H04N 21/4826 |
| 2017/0189809 A1 | 7/2017 | Posin et al. | |
| 2018/0152759 A1 | 5/2018 | Miller | |
| 2018/0270520 A1* | 9/2018 | Ott | H04N 21/4532 |
| 2018/0309631 A1 | 10/2018 | Li et al. | |
| 2019/0005978 A1* | 1/2019 | Barnett | G10L 25/51 |
| 2019/0268659 A1 | 8/2019 | Kunieda | |

FOREIGN PATENT DOCUMENTS

| | | |
|---|---|---|
| EP | 3 756 356 | 12/2020 |
| JP | 2021-515463 | 6/2021 |
| JP | 7354127 | 9/2023 |
| WO | WO 2019/164360 | 8/2019 |

OTHER PUBLICATIONS

PCT Application No. PCT/US2019/015003 International Preliminary Report on Patentability dated Aug. 27, 2020.
PCT Application No. PCT/US2019/015003 International Search Report and Written Opinion dated May 23, 2019.
U.S. Appl. No. 15/904,163 Office Action mailed Oct. 18, 2021.
U.S. Appl. No. 15/904,163 Final Office Action mailed Apr. 19, 2021.
U.S. Appl. No. 15/904,163 Office Action mailed Nov. 23, 2020.
U.S. Appl. No. 15/904,163 Final Office Action mailed Jan. 13, 2020.
U.S. Appl. No. 15/904,163 Office Action mailed Aug. 16, 2019.
U.S. Appl. No. 15/904,163 Final Office Action mailed Apr. 19, 2019.
U.S. Appl. No. 15/904,163 Office Action mailed Jan. 14, 2019.
European Application No. 19756885.0 Official Letter dated Jul. 5, 2023.
Japanese Application No. 2020-544596 Non-Final Notification of Reasons for Refusal dated Apr. 4, 2023.

* cited by examiner

PROVIDING ACTIVITY NOTIFICATIONS REGARDING DIGITAL CONTENT

CROSS-REFERENCE TO RELATED APPLICATION

The present application is a continuation and claims the priority benefit of U.S. patent application Ser. No. 15/904,163 filed Feb. 23, 2018, now U.S. Pat. No. 11,463,773, which is incorporated herein by reference in its entirety.

BACKGROUND

Field of the Invention

The present disclosure generally relates to notifications for digital content, and more particularly, to techniques for providing notifications for relevant and trending digital content.

Description of the Related Art

Technological advances that gave rise to our modern information age also facilitated an explosion of easily and readily accessible digital content. The volume, portability, and immersive nature of this digital content present new challenges and create new opportunities regarding content management and notification. Early techniques to organize digital content mirror rudimentary techniques employed to organize physical content (e.g., hardcopy content)—e.g., alphabetizing content according to titles, authors, genres, and the like. However, these early techniques often prove inadequate and fail to capture a myriad of evolving and diverse features present in modern digital content. Indeed, as modern digital content and supporting platforms become more accessible and immersive, a need in the art arises to parse available content, identify relevant content, and provide notifications regarding the same.

SUMMARY OF THE PRESENTLY CLAIMED INVENTION

This disclosure generally describes techniques to provide notifications regarding relevant and trending digital content. In one exemplary embodiment, these techniques are described, in part, by a method that includes steps for identifying an instance of content accessible over a network as relevant content. For example, identifying relevant content can include determining a user subscription to the instance of content, a user library includes the instance of content, a user contact subscribed to the instance of content, the content library of the user contact includes the instance of content, and the like. The method also includes steps for monitoring a volume of activity associated with the relevant content over a period of time. For example, the volume of activity can include a number of messages, a number of users engaged in liv gameplay, a number of keyword mentions, and the like. The method also describes steps for comparing the volume of activity over the time period to a threshold level and sending a notification to a client device when the volume of activity exceeds the threshold level.

In some embodiments, the notification indicates the relevant content is trending (e.g., represented by increases in user activity). In addition, in some embodiments, the instance of content is associated with a content type. In such embodiments, the method includes steps for mapping the content type to a notification type (e.g., a noise, a sound, a display notification, etc.) and sending the notification based on the notification type.

In another embodiment, a system employs the above discussed techniques to notifications regarding relevant and trending digital content. In this embodiment, the system includes a network interface to communicate over one or more communication networks, a processor coupled to the network interface and adapted to execute one or more processes, and a memory configured to store a process executable by the processor. The system (e.g., the processor) executes the process and is operable to identify an instance of content accessible over a network as relevant content, monitor a volume of activity associated with the relevant content over a period of time, compare the volume of activity over the time period to a threshold level, and send a notification to a client device when the volume of activity exceeds the threshold level.

In yet another embodiment, a tangible, non-transitory, computer-readable media includes software with encoded instructions executable by a processor. These instructions incorporate the above described method for providing notifications regarding relevant and trending digital content. For example, the processor executes the instructions and is operable to identify an instance of content accessible over a network as relevant content, monitor a volume of activity associated with the relevant content over a period of time, compare the volume of activity over the time period to a threshold level, and send a notification to a client device when the volume of activity exceeds the threshold level.

DETAILED DESCRIPTION

As used herein, the term "user" refers to a user of an electronic device(s) and actions performed by the user in the context of computer software shall be considered to be actions to provide an input to electronic device(s) that cause the electronic device to perform steps or operations embodied in computer software. As used herein, the terms "stream", "content", and/or "channel" generally refer to digital media content that includes visual and/or audio data.

As discussed above, conventional techniques for categorizing, organizing, or otherwise managing physical content often prove inadequate when applied to the myriad of evolving and diverse features present in modern digital content. Moreover, platforms that support digital content provide new opportunities to interact with its users. For example, users often have a variety of devices, including portable devices, that can access digital content any time and any place. With such constant access, it becomes difficult and time-consuming to parse through an ever increasing amount of digital content. Accordingly, the techniques disclosed herein identify relevant content, monitor activity related to the relevant content, and provide notifications regarding the same. Notably, the notifications can indicate certain relevant content as trending and may include noises, sounds, display notifications, and the like.

Figure 1:
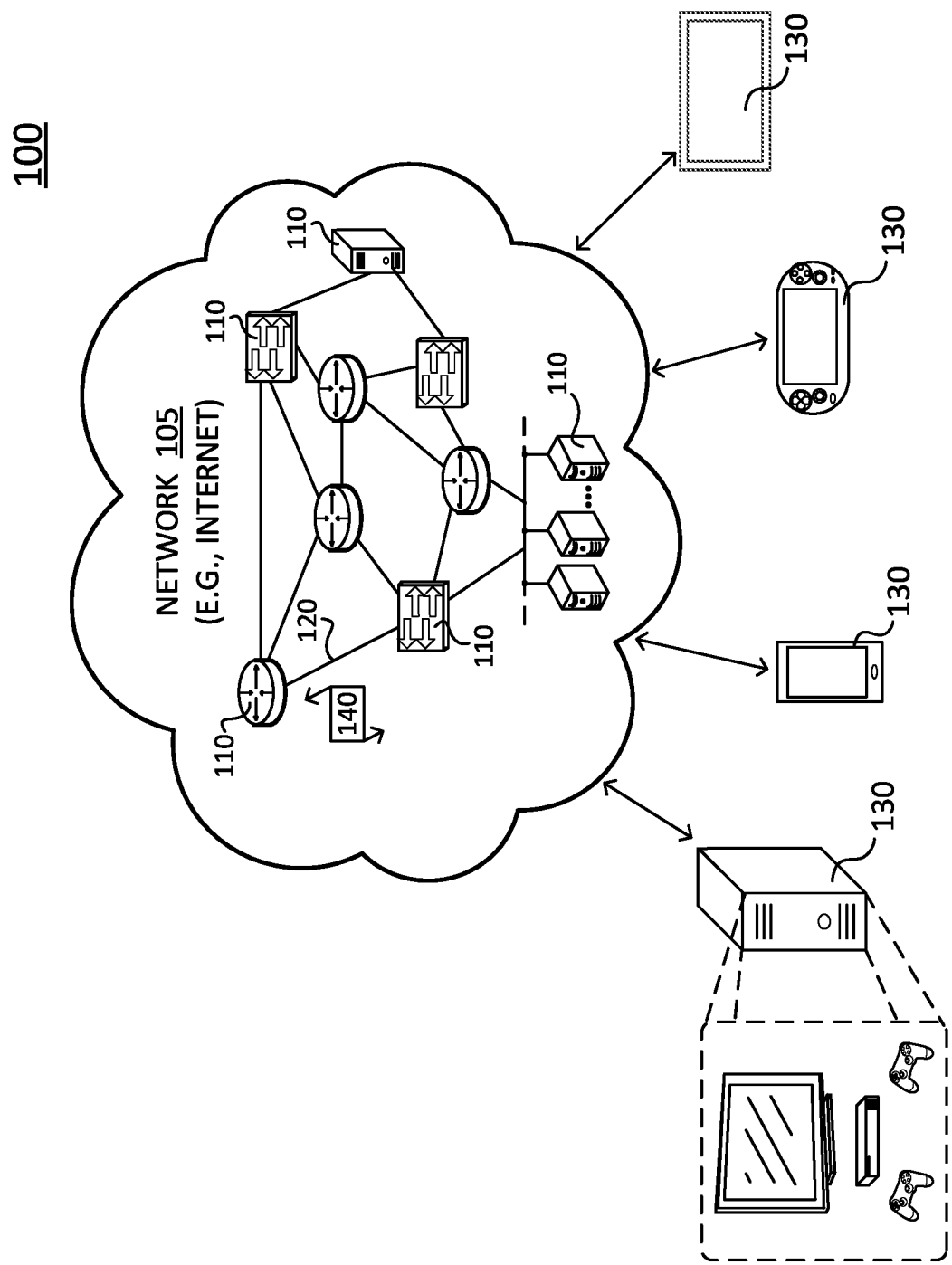
FIG. 1 illustrates a schematic diagram of an example communication network.

Referring to the figures, FIG. 1 illustrates a schematic diagram of an example communication environment 100. Communication environment 100 includes a communication network 105 that represents a distributed collection of devices/nodes 110 interconnected by communication links 120 (and/or network segments) for exchanging data such as data packets 140 as well as for transporting data to/from end nodes or client devices 130. Notably, devices/nodes 110 can include network platforms that host digital content and client devices 130 can include personal computing devices, entertainment consoles, game systems, laptops, tablets, mobile devices, and the like. In operation, client devices 130 can access digital content from devices/nodes 110 over communication links 120.

Communication links 120 represent wired links or shared media links (e.g., wireless links, PLC links, etc.) where certain devices/nodes (e.g., routers, servers, switches, client devices, etc.) communicate with other devices/nodes 110, based on distance, signal strength, operational status, location, etc. Those skilled in the art will understand that any number of nodes, devices, links, etc. may be included in communication network 105, and further the view illustrated by FIG. 1 is provided for purposes of discussion, not limitation.

Data packets 140 represent network traffic/messages which are exchanged over communication links 120 and between network devices 110/130 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the devices or nodes interact with each other.

Figure 2:
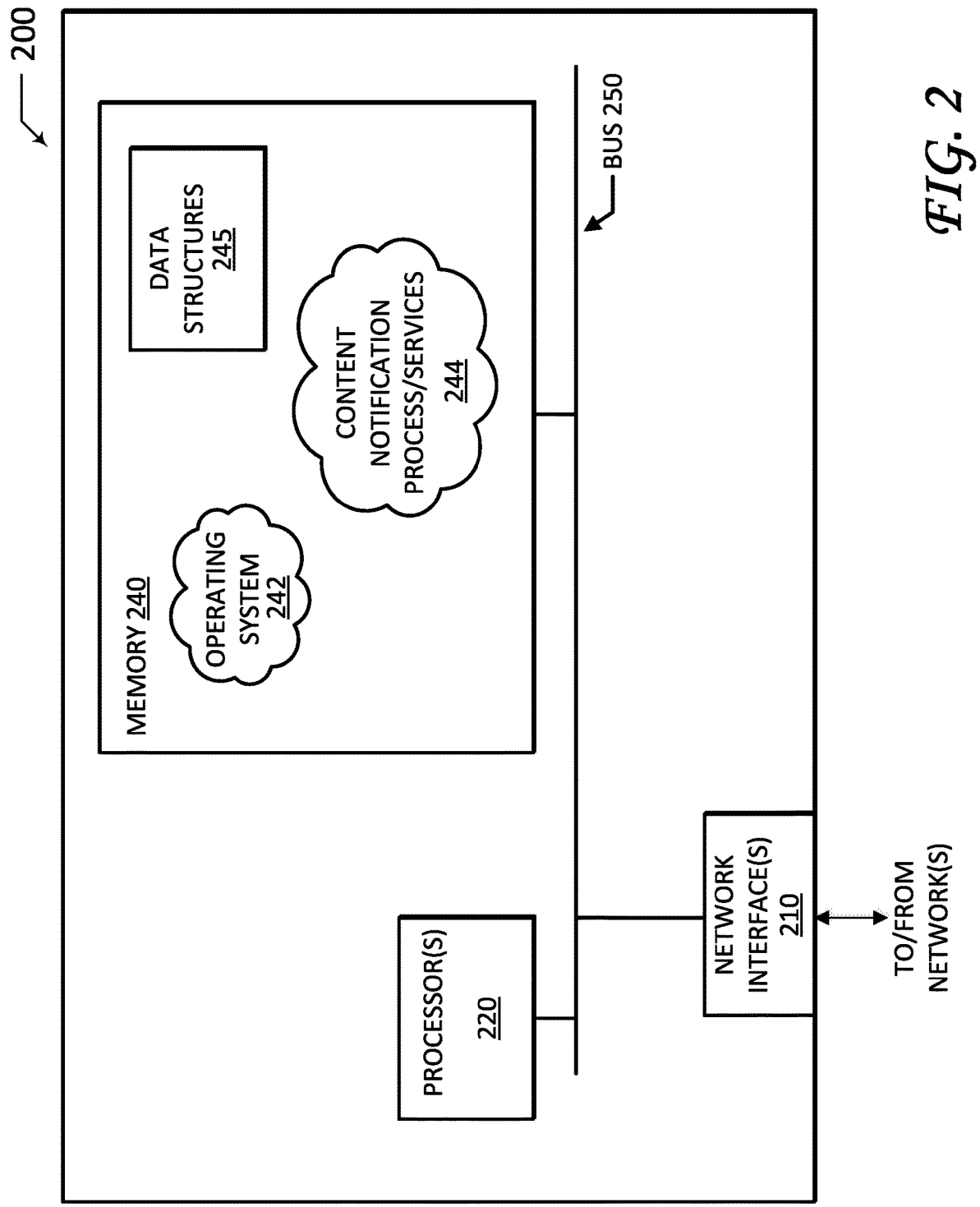
FIG. 2 illustrates a block diagram of an example network device.

FIG. 2 illustrates a block diagram of an example device 200, which may represent one or more of devices 110/130 (or portions thereof). As shown, device 200 includes one or more network interfaces 210 (e.g., transceivers, antennae, etc.), at least one processor 220, and a memory 240 interconnected by a system bus 250.

Network interface(s) 210 contain the mechanical, electrical, and signaling circuitry for communicating data over communication links 120 (shown in FIG. 1). Network interfaces 210 are configured to transmit and/or receive data using a variety of different communication protocols, as will be understood by those skilled in the art.

Memory 240 comprises a plurality of storage locations that are addressable by processor 220 and store software programs and data structures associated with the embodiments described herein. For example, memory 240 can include a tangible (non-transitory) computer-readable medium, as is appreciated by those skilled in the art.

Processor 220 represents components, elements, or logic adapted to execute the software programs and manipulate data structures 245, which are stored in memory 240. An operating system 242, portions of which are typically resident in memory 240, and is executed by processor 220 to functionally organizes the device by, inter alia, invoking operations in support of software processes and/or services executing on the device. These software processes and/or services may comprise an illustrative content notification process/service 244. While content notification process/service 244 is shown in centralized memory 240, in some embodiments it may be configured to collectively operate in a distributed communication network of devices/nodes.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having content notification process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

Figure 3:
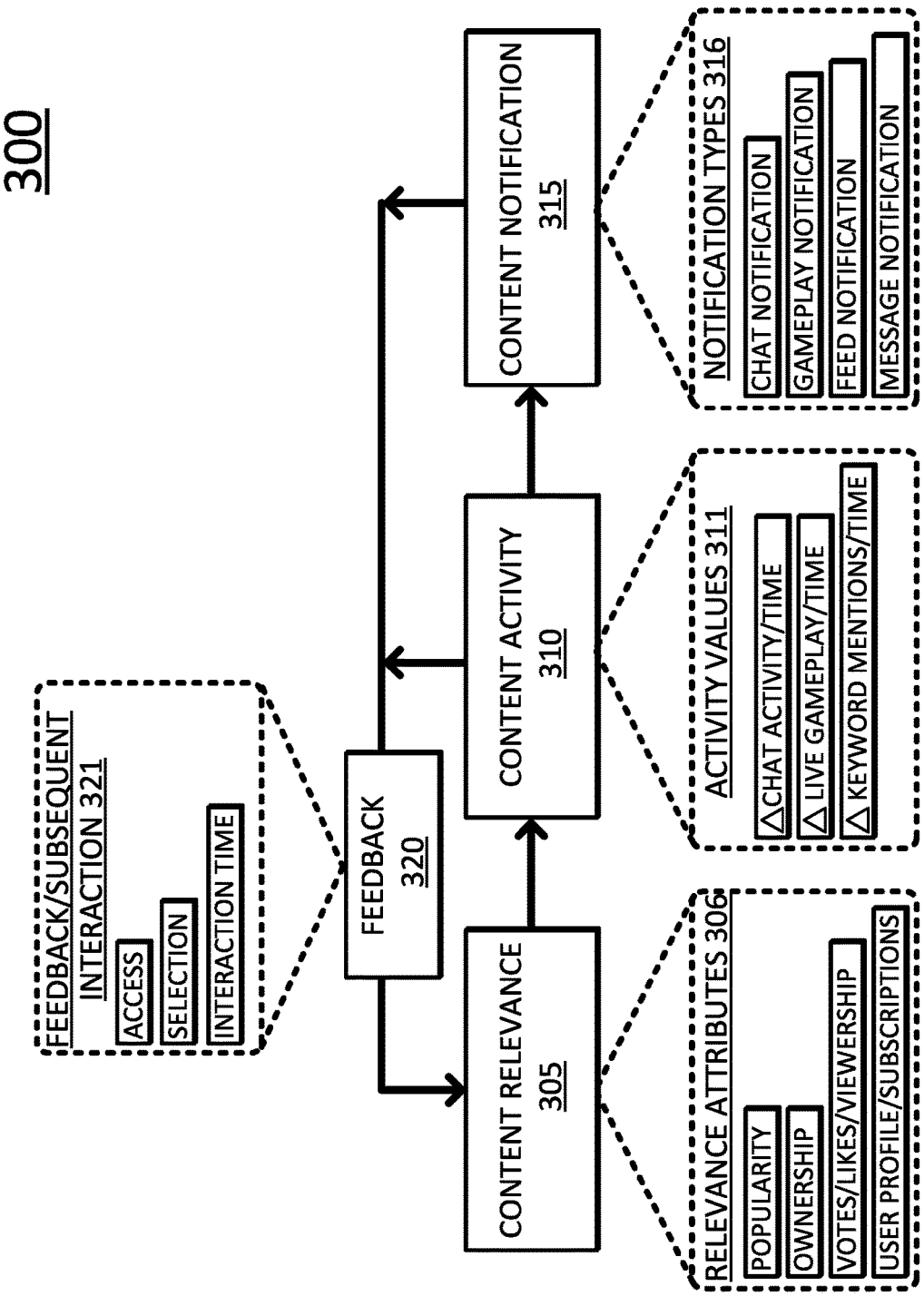
FIG. 3 illustrates a schematic diagram of a notification process.

FIG. 3 illustrates schematic diagram of a notification process 300. Notification process 300 is represented by four operational modules and includes a content relevance module 305, a content activity module 310, a content notification module 315 and a feedback module 320.

Content relevance module 305 evaluates instances of content and determines its relevance to a particular user. As mentioned above, content refers to digital media content that includes visual and/or audio data. Examples of instances of content can include chats, live gameplay, feeds associated with gameplay, and the like.

In operation, content relevance module 305 identifies certain instances of content as relevant content based on its relevance attributes 306. In particular, content relevance module 305 determines content is relevant to a user based on content popularity, user ownership, votes, likes, viewership, a user profile (which can be used to find related relevant content), user subscriptions, and so on. It is appreciated that content relevance module 305 may employ any variety of techniques to identify or determine when content is relevant to a given user. For example, these techniques may determine content is relevant based on direct user selection or input (e.g., purchases, selections, etc.) and/or may determine content is relevant based on indirect relationships to users (e.g., contacts of the user share similar preferences for content). Moreover, it is appreciated machine learning may be employed to identify relationships and preferences between users and content.

After content relevance module 305 identifies certain instances of content as relevant content, content activity module 310 monitors activity regarding the relevant content. For example, content activity module may monitor one or more activity values 311, including chat activity, live gameplay participation, keyword mentions, and so on. While activity values 311 provide specific examples of activity, it is appreciated content activity module 310 can monitor any type of activity or interaction between users and digital content. In addition, it is appreciated content activity module 310 can operate to monitor an increase or decrease (e.g., "delta") in activity for a given time period, which represents trends for relevant content. In this fashion, content activity module 310 can monitor a volume of activity associated with relevant content over a time period.

In addition, content activity module 310 further compares the volume of activity over the time period to a threshold level (e.g., a threshold activity level). This threshold level provides a limit or a filter to ensure subsequent notifications do not overwhelm a user. The threshold level may be initially established by a user and/or provided in a default setting. Notably, the threshold level may be adjusted over time based on user preferences and/or based on feedback module 320.

Content notification module 315 sends a notification regarding the relevant content to a client device (e.g., one of client devices 130) when the volume of activity exceeds the threshold level. The notification can include a noise, a sound, a display graphic, haptic feedback (e.g., vibration), or other notifications to raise user awareness for trending relevant content. For example, the notification may be pushed to any number of client devices associated with a user. This can include a mobile device, a game console, a smart TV, a computer, a laptop, a tablet, etc.

Moreover, in some embodiments, the notification may be mapped to a particular type. For example, the relevant content can include a variety of digital content (as mentioned above), and each type of content may be further mapped to a specific notification type. For purposes of discussion and to provide an illustrative example, the content types can include a chat, live gameplay, and a feed associated with gameplay. In this example, the notification can include three different noises for each content type—e.g., the chat may be mapped to a horn, the live gameplay may be mapped to a game-specific noise, and the feed may be mapped to a siren. In operation, content relevance module 305 determines the chat, live gameplay, and the feed are relevant, and content activity module 310 monitors activity corresponding to the relevant content. When the activity for the relevant content—e.g., here, the chat—exceeds the threshold level, content notification module 315 sends a horn signal to a client device (e.g., a game console) associated with a user. In turn, the client device sounds the horn signal to the user. Notably, the horn signal may be played by one client device or by multiple client devices, depending on user preferences.

Feedback module 320 monitors user activity after notification module 315 sends its notification. In particular, feedback module 320 monitors subsequent interaction(s) 321, including accessing the relevant content, selecting the relevant content (e.g., purchasing, renting, or otherwise selecting), an interaction time with the relevant content (e.g., a time period when the relevant content is active on the display, the user scrolling through a chat conversation, etc.), and so on.

Feedback module 320 provides an important mechanism to monitor subsequent user interaction with the relevant content and provides important metrics to further adjust a frequency and/or type of notification. For example, if a user ignores the notification and/or ignores the relevant content (post notification), content relevance module 305 may determine the content is no longer relevant to the user. Likewise, if a user immediately calls up the notification and/or quickly accesses the relevant content (post notification), content relevance module 305 may further prioritize or weight the relevant content to ensure the client device and/or user receive notifications for the relevant content. It is appreciated feedback module 320 and content relevance module 305 may employ various types of analytics to monitor user interactions responsive to notifications and adjust content relevance determinations and/or content notifications based on the same.

Collectively, the modules illustrated by notification process 300 operate in conjunction to identify or determine an instance of content is relevant content, monitor a volume of activity associated with the relevant content (e.g., over a time period), compare the volume of activity to a threshold level, and send a notification to a client device when the volume of activity exceeds the threshold level. While the modules are shown as separate and independent modules, it is appreciated any number of modules, including a few number of modules, may be used to perform the above discussed operations.

Figure 4:
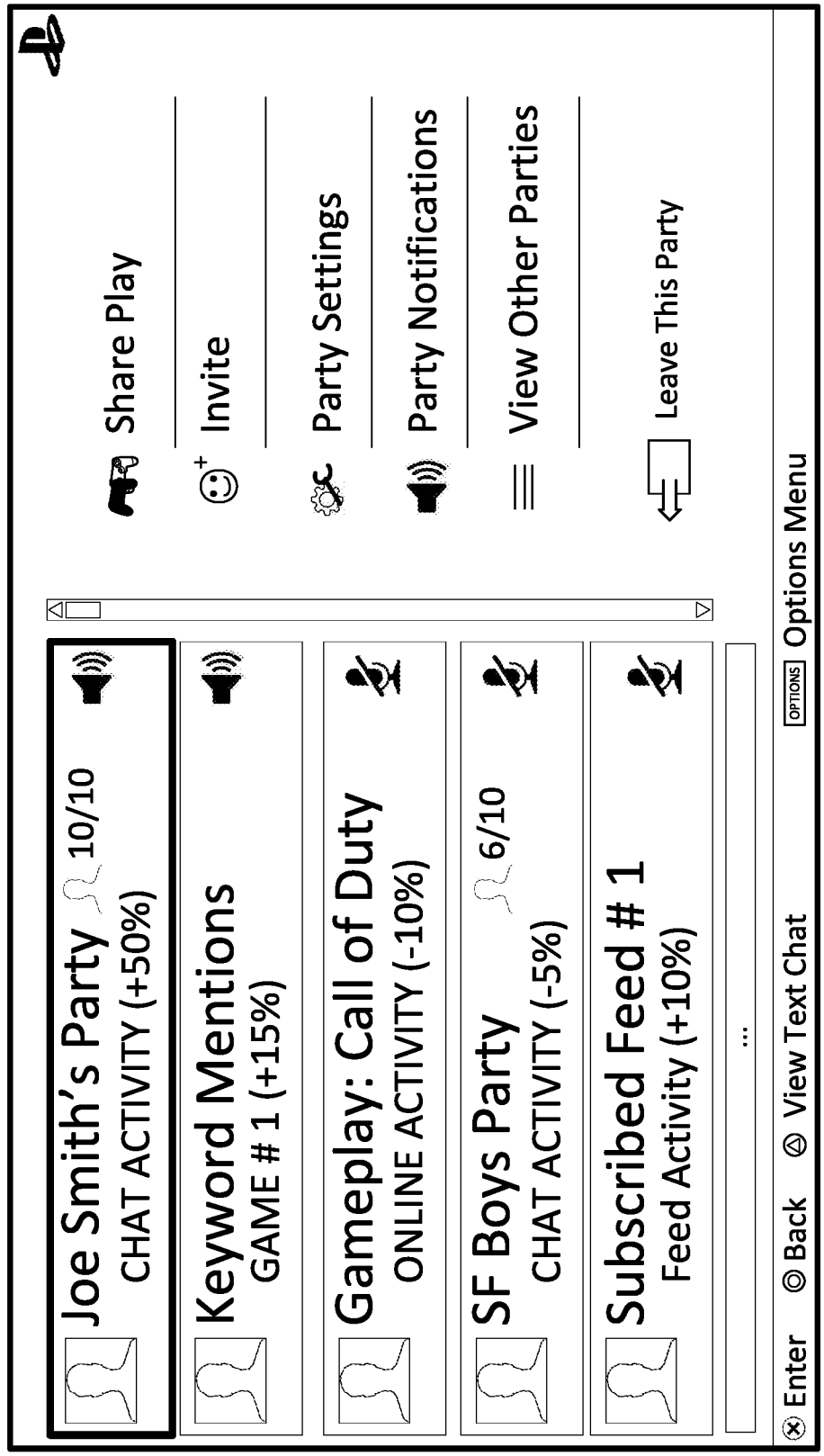
FIG. 4 illustrates a schematic diagram of a content notification management screen.

FIG. 4 illustrates a schematic diagram of a content notification management screen 400, particularly from the perspective of a client device (e.g., one of client devices 130). Content notification management screen 400 illustrates a number of subscriptions for a user as well as graphical icons to represent notification preferences. Although the subscriptions each include relevant content, the user may further set a preference regarding notifications. For example, here the user allows notifications for a chat—e.g., "Joe Smith's Party"—and a keyword category—e.g., "Keyword Mentions: Game #1". In contrast, the user disabled notifications for other relevant content—namely, "Gameplay: Call of Duty", "SF Boys Party", and "Subscribed Feed 1". Accordingly, the user will receive notifications for Joe Smith's Party and Keyword Mentions related to Game #1 (when the activity for the respective relevant content exceeds the threshold level), but the user will not receive notifications for other relevant content (regardless of activity).

In addition, content notification management screen 400 also shows a percentage of recent activity along with a description of the subscription/relevant content. This percentage can represent increases or decreases in activity such as a number of comments or a number of mentions for a given time period. As mentioned, the threshold level may be initially established by a user and/or provided in a default setting. The user can adjust the threshold level for corresponding relevant content based on a percentage, an absolute value, a rate change, a time period, and so on.

Figure 5:
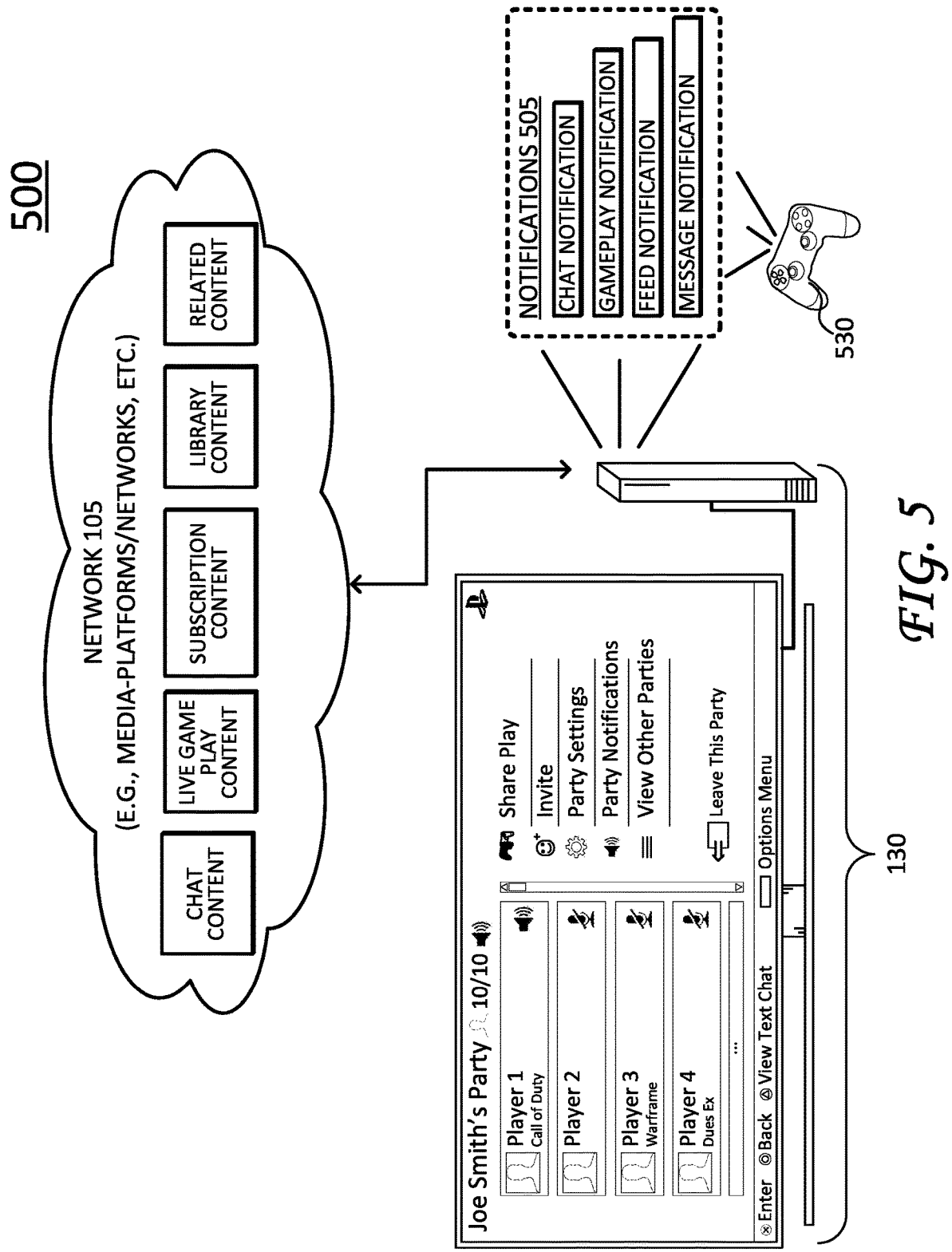
FIG. 5 illustrates a schematic diagram of system that provides notifications regarding relevant and trending content.

FIG. 5 illustrates a schematic diagram of system 500 that provides notifications regarding relevant and trending content. As shown, FIG. 5 includes network 105, which provides access to instances of content such as chat content, live gameplay content, subscription content, library content, related content, and so on.

In operation, a game console or client device 130 accesses the instances of content and provides notifications—e.g., notifications 505—regarding activity for relevant content. For example, client device 130 and/or a controller 530 (which is associated with client device 130) may perform functionality described by content relevance module 305, content activity module 310, content notification module 315, and/or feedback module 320 to identify instances of content as relevant content, monitor a volume of activity associated with the relevant content, compare the volume of activity to a threshold level, and send a notification (e.g., one or more of notifications 505) when the volume of activity exceeds the threshold level. As shown, the notification can include a sound, a noise, a display graphic (e.g., text message, graphic icon, etc.), haptic feedback, and so on. In addition, as mentioned above, each one of notifications 505 can be associated with a notification type mapped to a specific type (or instance) of content.

Figure 6:
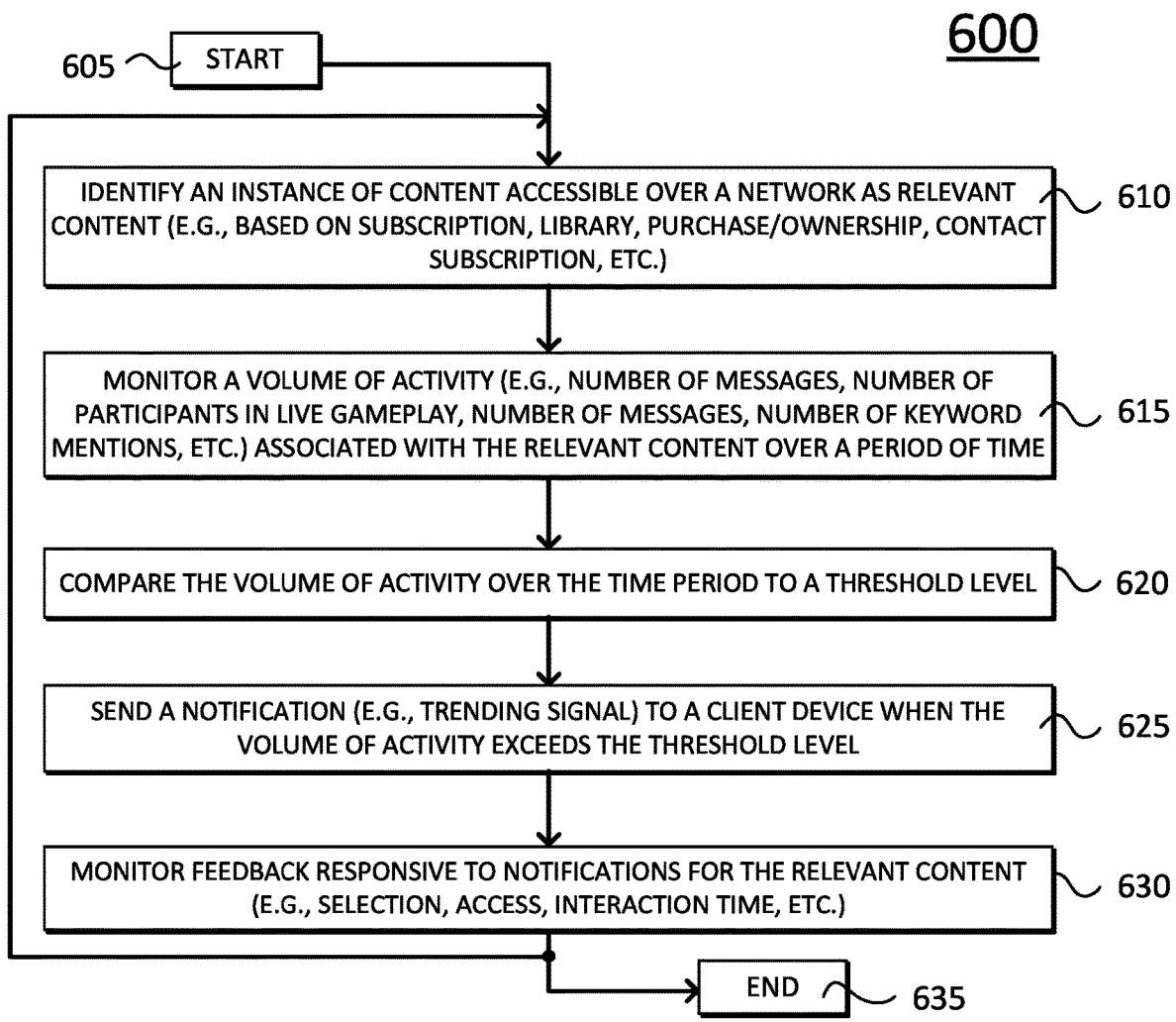
FIG. 6 illustrates an example simplified procedure for providing notifications regarding relevant and trending content.

FIG. 6 illustrates an example simplified procedure 600 for providing notifications regarding relevant and trending content. Procedure 600 is particularly described with respect to notification system that incorporates functionality of content relevance module 305, content activity module 310, content notification module 315 and feedback module 320, however it is appreciated such the operations performed by the notification system are not intended to be limited by such modules.

Procedure 600 begins at step 605 and continues on to step 610 where the notification system identifies an instance of content (accessible over a network) as relevant content. For example, as discussed above, the notification system may employ functionality similar to content relevance module 305 to determine instances of content as relevant based on subscriptions, a user library, user purchases/ownership, subscriptions for contacts, and so on.

Procedure 600 continues on to step 615 where the notification system further monitors a volume or activity associated with the relevant content over a period of time. The volume of activity can include, for example, a number of messages, a number of subscribers, a number of participants for a live gameplay feed, a number of keyword mentions, and the like. In addition, the notification system also compares, at step 620, the volume of activity over the time period to a threshold level and sends, at step 625, a notification to a client device when the volume of activity exceeds the threshold level. The notification can represent a trending signal and can include any number of noises, sounds, graphics, display icons, haptic feedback (e.g., vibration), and the like.

The notification system also monitors feedback, at step 630, responsive to notifications for the relevant content. For example, similar to feedback module 320, the notification system monitors user feedback such as selection of the relevant content, user access to the relevant content (e.g., within a notification time period), user interaction with the relevant content, and the like. This feedback may be subsequently used in step 610, where the notification system identifies an instance of content as relevant content. Procedure 600 subsequently ends at step 635, but may continue on to step 610, discussed above.

Collectively, the steps in 600 1300 describe techniques to provide notifications regarding relevant and trending digital content. It should be noted some steps within procedure 600 may be optional, and further the steps shown are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, describe operations to notify users regarding trends for relevant digital content. While there have been shown and described illustrative embodiments to perform certain functions using particular devices and/or modules, it is to be understood that various other adaptations and modifications may be made within the spirit and scope of the embodiments herein. For example, the embodiments have been shown and described herein with relation to certain systems, platforms, devices, and modules performing specific operations. However, the embodiments in their broader sense are not as limited, and may, in fact, such operations and similar functionality may be performed by any combination of the devices shown and described.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories such as disks, CDs, RAM, and EEPROM having program instructions executing on a computer, hardware, firmware, or a combination thereof.

Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code.

Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on.

Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures.

Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for providing notifications regarding activity associated with digital content, the method comprising:
storing information regarding media content titles accessible over a network and associated with a user profile;
monitoring one or more activity values associated with each of the media content titles over a period of time during an interactive session, wherein the activity values correspond to different content types including one or more of chat, live gameplay, and keyword usage;
determining a change in one or more of the activity values for each of the media content titles over the period of time;
generating a notification to a client device associated with the user profile when at least one of the activity values associated with at least one of the media content titles exceeds a respective threshold level, the notification concerning the at least one media content title, wherein a type of the notification is based on a mapping between different types of notification and the different content types;
identifying a subsequent action of active engagement with the at least one media content title by a user associated with the user profile in response to the notification; and
updating a frequency of a subsequent notification sent to one or more user devices associated with the user profile based on the subsequent action.

2. The method of claim 1, wherein the one or more activity values pertain to different content types including at least one of chat activity, live gameplay, or keyword mentions.

3. The method of claim 2, wherein generating the notification is further based on one or more of the different content types associated with the at least one media content title, and wherein each content type is associated with a different sound notification alert.

4. The method of claim 1, wherein the subsequent action includes at least one of accessing relevant content, selecting or purchasing the relevant content, or actively engaging with the at least one media content title, and wherein the updated frequency is increased.

5. The method of claim 1, further comprising adjusting the respective threshold level over time based on feedback regarding the subsequent action.

6. The method of claim 1, wherein the subsequent action includes ignoring the notification, and wherein the updated frequency is reduced.

7. The method of claim 1, further comprising determining that the at least one media content title is relevant to the user profile based on one or more of content popularity, user ownership, votes, likes, and viewership.

8. The method of claim 1, further comprising setting a preference in the user profile regarding allowing or disabling notifications for a specified chat, keyword mention, or other content titles.

9. A system for providing notifications regarding activity associated with digital content, the system comprising:
a memory that stores information regarding media content titles accessible over a network and associated with a user profile; and
one or more processors configured to execute instructions stored in memory, wherein the one or more processors execute the instructions to:
monitor one or more activity values associated with each of the media content titles over a period of time during an interactive session, wherein the activity values correspond to different content types including one or more of chat, live gameplay, and keyword usage;
determine a change in one or more of the activity values for each of the media content titles over the period of time;
generate a notification to a client device associated with the user profile when at least one of the activity values associated with at least one of the media content titles exceeds a respective threshold level, the notification concerning the at least one media content title, wherein a type of the notification is based on a mapping between different types of notification and the different content types;
identify a subsequent action of active engagement with the at least one media content title by a user associated with the user profile in response to the notification; and
update a frequency of a subsequent notification sent to one or more user devices associated with the user profile based on the subsequent action.

10. The system of claim 9, wherein the one or more activity values pertain to different content types including at least one of chat activity, live gameplay, or keyword mentions.

11. The system of claim 10, wherein the one or more processors further execute the instructions to: generate the notification further based on one or more of the content types associated with the at least one media content title, and wherein each content type is associated with a different sound notification alert.

12. The system of claim 9, wherein the subsequent action includes at least one of accessing relevant content, selecting or purchasing the relevant content, or actively engaging with the at least one media content title, and wherein the updated frequency is increased.

13. The system of claim 9, wherein the one or more processors execute further instructions to adjust the respective threshold level over time based on feedback regarding the subsequent action.

14. The system of claim 9, wherein the subsequent action includes ignoring the notification, and wherein the updated frequency is reduced.

15. The system of claim 9, wherein the one or more processors execute further instructions to determine that the at least one media content title is relevant to the user profile based on one or more of content popularity, user ownership, votes, likes, and viewership.

16. The system of claim 9, wherein the one or more processors execute further instructions to set a preference in the user profile regarding allowing or disabling notifications for a specified chat, keyword mention, or other content titles.

17. A non-transitory computer-readable storage medium comprising instructions, the instructions, when executed by a computing system, cause the computing system to:
storing information regarding media content titles accessible over a network and associated with a user profile;
monitoring one or more activity values associated with each of the media content titles over a period of time during an interactive session, wherein the activity values correspond to different content types including one or more of chat, live gameplay, and keyword usage;
determining a change in one or more of the activity values for each of the media content titles over the period of time;
generating a notification to a client device associated with the user profile when at least one of the activity values associated with at least one of the media content titles exceeds a respective threshold level, the notification concerning the at least one media content title, wherein a type of the notification is based on a mapping between different types of notification and the different content types;

identifying a subsequent action of active engagement with the at least one media content title by a user associated with the user profile in response to the notification; and updating a frequency of a subsequent notification sent to one or more user devices associated with the user profile based on the subsequent action.

* * * * *